US008892131B2

(12) United States Patent
Billmaier et al.

(10) Patent No.: US 8,892,131 B2
(45) Date of Patent: *Nov. 18, 2014

(54) MOBILE LOCATION AND MAP ACQUISITION

(75) Inventors: James A Billmaier, Woodinville, WA (US); David P Billmaier, Woodinville, WA (US); John M Kellum, Woodinville, WA (US)

(73) Assignee: Patent Navigation Inc., Seattle, WA (US)

( * ) Notice: Subject to any disclaimer, the term of this patent is extended or adjusted under 35 U.S.C. 154(b) by 177 days.

This patent is subject to a terminal disclaimer.

(21) Appl. No.: 13/464,996

(22) Filed: May 6, 2012

(65) Prior Publication Data

US 2013/0138344 A1    May 30, 2013

Related U.S. Application Data

(63) Continuation of application No. 11/893,867, filed on Aug. 17, 2007, now Pat. No. 8,185,133.

(60) Provisional application No. 60/838,575, filed on Aug. 18, 2006.

(51) Int. Cl.
*H04W 24/00* (2009.01)
*G01C 21/00* (2006.01)

(52) U.S. Cl.
CPC ............... *G01C 21/00* (2013.01); *G01C 21/005* (2013.01)
USPC ................... 455/456.3; 455/456.1; 455/414.1

(58) Field of Classification Search
None
See application file for complete search history.

(56) References Cited

U.S. PATENT DOCUMENTS

| 8,185,133 | B2 * | 5/2012 | Billmaier et al. | 455/456.3 |
| 8,577,734 | B2 * | 11/2013 | Treyz et al. | 705/26.1 |
| 2002/0006788 | A1 * | 1/2002 | Knutsson et al. | 455/422 |
| 2010/0121567 | A1 * | 5/2010 | Mendelson | 701/206 |

* cited by examiner

*Primary Examiner* — Erika A Washington
(74) *Attorney, Agent, or Firm* — FSP LLC

(57) ABSTRACT

Providing a map and/or directions to a visitor to a facility may include and/or involve a wireless communication device signaling its presence at a location in a facility, and communicating to the wireless communication device a map of the facility indicating the location. This may include and/or involve communicating to the wireless device directions to and/or from the location to a destination within the facility.

4 Claims, 2 Drawing Sheets

MOBILE LOCATION AND MAP ACQUISITION

PRIORITY

This application claims priority and benefit as a continuation of U.S. application Ser. No. 11/893,867, filed on Aug. 17, 2007, now granted as U.S. Pat. No. 8,185,133, which claims benefit and priority under 35 U.S.C. 119 to U.S. application Ser. No. 60/838,575, filed on Aug. 18, 2006, each of which is incorporated herein by reference in their entirety.

TECHNICAL FIELD

The present disclosure relates to mapping.

BACKGROUND

Large facilities may present navigation problems for the uninitiated visitor. Such facilities include large office complexes, malls, shopping districts, airports, and government facilities. A visitor may forget where they parked their car, or may repeatedly inquire about directions to or from their intended destination(s).

Facilities may provide printed directories and information booths to assist the uninitiated visitor to their destination(s). Printed directories and information booths may not always be located in convenient locations, and the visitor may be delayed to their destination by the necessity of digression to obtain directions.

SUMMARY

The following summary is intended to highlight and introduce some aspects of the disclosed embodiments, but not to limit the scope of the claims. Thereafter, a detailed description of illustrated embodiments is presented, which will permit one skilled in the relevant art to make and use various embodiments.

Providing a map and/or directions to a visitor to a facility may include and/or involve a wireless communication device signaling its presence at a location in a facility, and communicating to the wireless communication device a map of the facility indicating the location. This may include and/or involve communicating to the wireless device directions to and/or from the location to a destination within the facility.

The device may signal its presence at a parking space, office, conference room, waiting area, retail outlet, medical facility, information desk, or restrooms of the facility. The device may signal its presence as the result of a user of the device pressing one or more buttons, or otherwise issuing commands, and/or the wireless device may automatically signal its presence upon detecting a wireless service access point.

Directions may be provided to and/or from a parking space at the facility to an office, conference room, waiting area, retail outlet, medical facility, information desk, or restrooms of the facility.

A person may identify their presence or otherwise be identified at a location in the facility. A communication address of the wireless communication device associated with the person may then be identified. A map of the facility indicating the person's location and possibly other information such as possible destinations may be communicated to the device. The person may be identified from an access card or other portable credential, and/or the person may be identified biometrically.

Other system/method/apparatus aspects are described in the text (e.g., detailed description and claims) and drawings forming the present application.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware.

Figure 1:
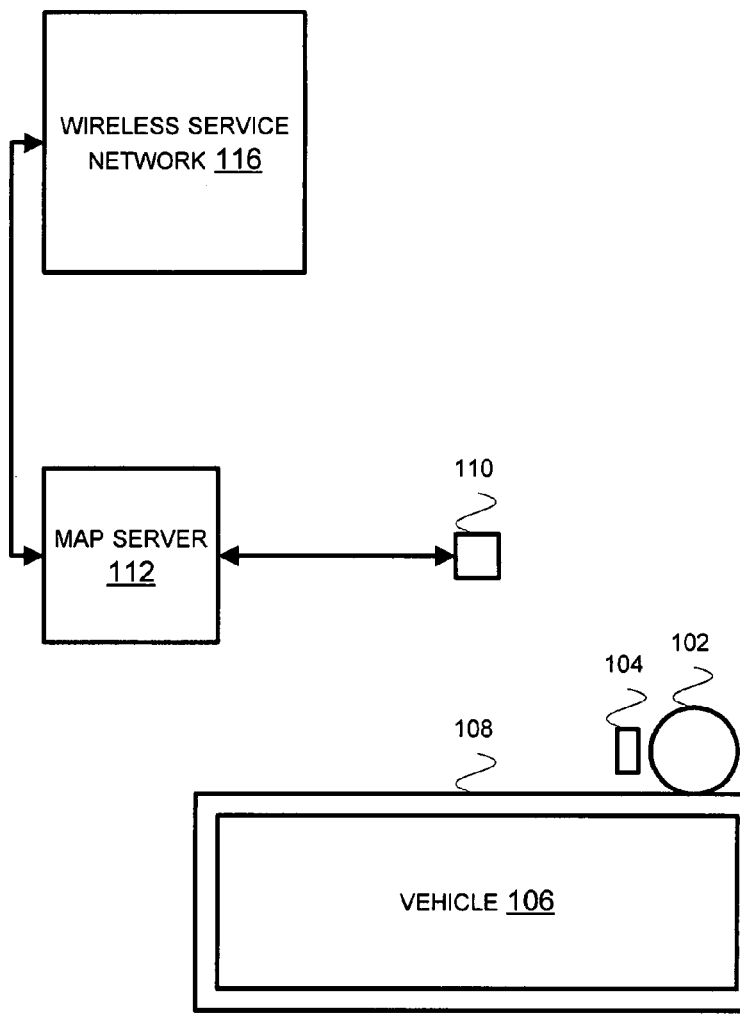
FIG. 1 is a block diagram of an embodiment of an environment in which a present location may be determined and a map produced to or from that location.

Environment in which a Present Location May be Determined and a Map Produced to or from that Location FIG. 1 is a block diagram of an embodiment of an environment in which a present location may be determined and a map produced to or from that location. The environment includes, but may not be limited to, a person 102, a mobile communication device 104, a vehicle 106, a parking space 108, a short-range wireless access point 110, a map server 112, a destination 114, and a wireless service network 116. Other elements and/or couplings among the elements have been omitted as they would be apparent to skilled practitioners in the relevant art(s).

The person 102 is someone in the facility carrying the mobile communication device 104. Often, the person 102 will be a visitor who is not entirely familiar with the facility. The mobile communication device 104 is a portable communication device having at least short-range wireless communication capability, such as, for example, a cell phone, PDA, laptop (notebook) or sub-notebook computer. The term 'PDA', as used herein, refers to 'personal digital assistant'. The vehicle 106 is any matter of conveyance used by person 102 to reach the facility, such as, for example, a car, truck, motorcycle, or bicycle. The parking space 108 is a location where the person 102 parks the vehicle 106.

The short-range wireless access point 110 is a proximate detector that converts wireless signals from the mobile communication device 104 to electrical and/or optical signals, or to more powerful wireless signals, and communicates with networked communication and data processing equipment. Examples of wireless access points are Wi-Fi 'hot spots', Bluetooth devices, and cellular receivers. The short-range wireless access point 110 may also communicate map information wirelessly to the mobile communication device 104.

The map server 112 comprises network equipment that stores and/or generates map information for the facility. The map server 112 may comprise one or more server computers of a LAN, intranet, and/or the Internet. The term 'LAN', as used herein, refers to 'local area network'. 'Intranet' refers to a facility-wide network.

The destination 114 is a destination within the facility, such as, for example, one or more shop, store, eating location, rest room, day care, office, or room. The wireless service network 116 is a service network for the mobile communication device 104, providing wireless access, call routing and completion, and data communication, among other things. Examples of a wireless service network 116 include service networks of Cingular, Verizon, and T-Mobile.

Other examples and/or embodiments of a mobile communication device 104, a vehicle 106, a short-range wireless access point 110, a map server 112, and a wireless service network 116 may be apparent to skilled practitioners in the relevant art(s).

Providing Maps Automatically

To assist the visitor to their destination, a wireless communication device 104 may signal its presence at a location in the facility, and a map of the facility indicating the location may be wirelessly communicated to the device 104. The map may indicate one or more destination locations of interest to the person 102. The person 102 may employ the map to more conveniently move to and from their location and their intended destination(s).

Directions to and/or from the location to a destination within the facility may also be communicated to the wireless device 104. For example, the directions may be to and/or from a parking space 108 at the facility to an office, conference room, waiting area, retail outlet, medical facility, information desk, or restrooms of the facility. This may be particularly convenient in situations where the layout of the facility is complicated (such as airports) and a person 102 may have difficulty remembering where they parked.

In some implementations, an RFID (radio frequency identifier) or other remote identification system may be located under or near the person's 102 parking space 108, and may provide the wireless communication device 104 with an identification of the parking space (such as 'H2 on the second level'), so that, at the least, the person 102 will later be able to recall where they parked their vehicle 106.

Signaling the Presence of a Wireless Device

The wireless device 104 may signal its presence at a parking space 108, office, conference room, waiting area, retail outlet, medical facility, information desk, or restrooms of the facility in various ways. For example, The wireless device 104 may signal its presence as the result of a user of the device (e.g. the person 102) pressing one or more buttons. The device 104 may signal its presence upon detecting a wireless service access point 110, for example by applying one or more of BlueTooth, Wi-Fi, or other short-range wireless technology to detect proximity of the wireless communication device 104 to a wireless service access point 110.

Identifying a Person

In some implementations, the person 102 may identify their presence or be identified at a location in the facility. A communication address of the wireless communication device 104 associated with the person 102 may then be identified, and a map of the facility indicating the person's location and/or locations of their possible destination(s) may be communicated to the wireless device 104.

The person 102 may be identified from an access card or other portable credential, and/or the person may be identified biometrically, for example via one or more of voice recognition, face recognition, fingerprint, or retina scan.

Providing Directions to and/or from a Present Location

Figure 2:
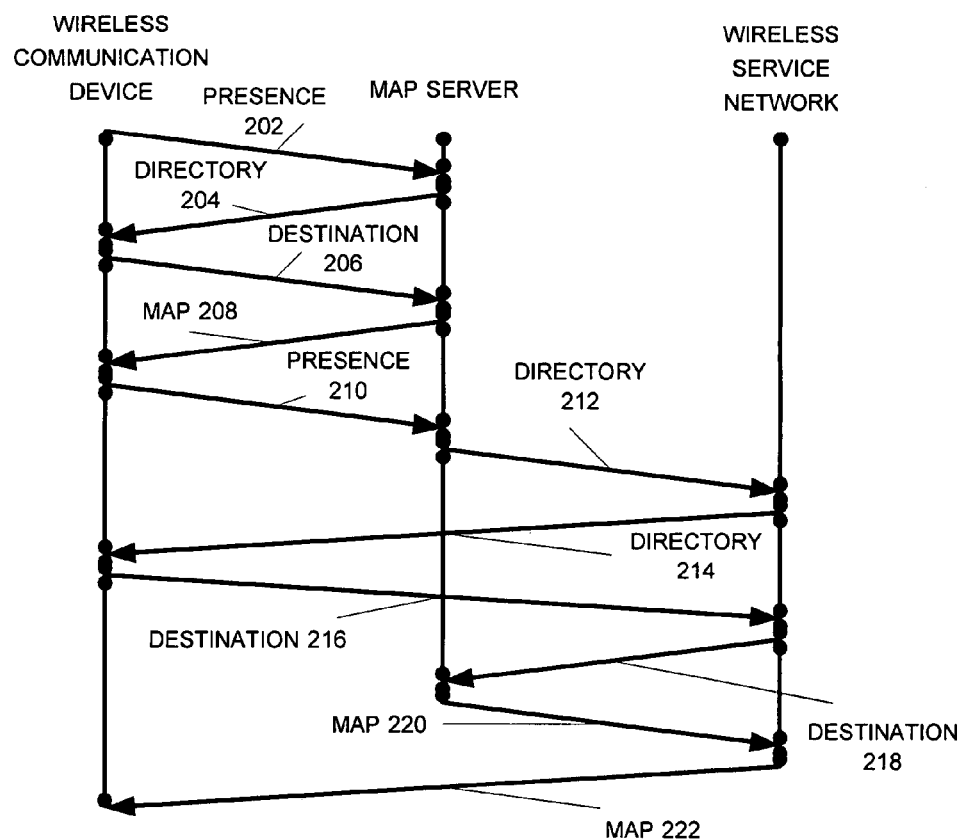
FIG. 2 is an action flow diagram of an embodiment of a process of providing directions to or from a present location.

FIG. 2 is an action flow diagram of an embodiment of a process of providing directions to or from a present location in a facility.

At 202 a wireless communication device provides a presence indication to a map server, typically via a wireless access point in a facility. At 204 the map server provides a facility directory to the wireless communication device. The provided directory may be filtered according to criteria provided by or on behalf of a user of the wireless device. For example, the user may indicate a preference for "clothing" and the map server may prioritize or otherwise emphasize clothing retailers in the provided directory. The map server may obtain the criteria from the wireless device or from a network-accessible source comprising information about a user of the wireless device, such as an Internet server. At 206 the wireless communication device provides an intended destination to the map server. For example, a user of the device may select the intended destination from the provided directory. At 208 the map server provides to the device a map and/or directions from the person's present location to the intended destination.

The facility may include wireless RF location points that track the progress of the wireless communication device through the facility, providing feedback to the device as to present location in the facility. The feedback may appear as indications of present location on the device's map.

Another possible implementation is illustrated by acts 210-222, in which the wireless service network for the person's device is employed to communicate map and/or directory information. At 210 a wireless communication device provides a presence indication to the map server. At 212 the map server provides a facility directory to a wireless service network for the wireless communication device. At 214 the wireless service network provides the directory to the wireless communication device. At 216 the wireless communication device provides a desired destination chosen from the directory, or selected via other means, to the wireless service network.

At 218 the wireless service network provides the desired destination to the map server. At 220 the map server provides the map to wireless service network, which at 222 provides the map to wireless communication device.

Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A system comprising:
an interface to receive a presence indication from a wireless communication device via a WiFi access point and to provide the presence indication to a map server via the WiFi access point; the map server configured to provide a facility directory to a wireless cellular service network for the wireless communication device in response to the presence indication, and to cause the wireless cellular service network to provide the facility directory to the wireless communication device; the map server configured to receive from the wireless communication device a desired destination chosen from the facility directory, to provide a map to the desired destination to wireless cellular service network, and to cause the wireless cellular service network to provide the map to the wireless communication device.

2. The system of claim 1, the map server further configured to receive via the interface to the WiFi access point criteria for filtering the facility directory according to criteria specified via the wireless device; and
the map server configured to filter the facility directory before providing the facility directory to the wireless cellular service network for the wireless communication device.

3. The system of claim 1, the map server configured to receive via the WiFi access point an identification of a person associated with the wireless device, the identification originating from an ID device carried by the person, the ID associated by the map server with the wireless cellular service network for the wireless device.

4. The system of claim 3, the ID device being a portable credential device carried separately from the wireless device.

* * * * *